(12) United States Patent
Kim

(10) Patent No.: US 9,986,366 B2
(45) Date of Patent: May 29, 2018

(54) CONTROLLING DATA COLLECTION INTERVAL OF M2M DEVICE

(71) Applicant: KT CORPORATION, Gyeonggi-do (KR)

(72) Inventor: Dong-Jun Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 582 days.

(21) Appl. No.: 14/205,253

(22) Filed: Mar. 11, 2014

(65) Prior Publication Data

US 2014/0258474 A1    Sep. 11, 2014

(30) Foreign Application Priority Data

Mar. 11, 2013  (KR) .......................... 10-2013-0025548

(51) Int. Cl.
*G06F 15/16* (2006.01)
*H04W 4/00* (2018.01)
*H04L 29/08* (2006.01)
*H04W 4/02* (2018.01)

(52) U.S. Cl.
CPC ........... *H04W 4/005* (2013.01); *H04L 67/125* (2013.01); *H04W 4/008* (2013.01); *H04W 4/02* (2013.01)

(58) Field of Classification Search
CPC ............... H04L 63/045; H04L 63/0442; H04L 41/0893; H04L 67/02; H04L 67/12; H04L 67/125; H04L 1/02; H04L 1/006; H04L 1/008; H04W 4/005; H04W 12/02; H04W 52/0216; H04W 52/0219; H04W 52/0229

USPC .................................................. 709/219, 227
See application file for complete search history.

(56) References Cited

U.S. PATENT DOCUMENTS

| | | | |
|---|---|---|---|
| 2008/0107037 A1* | 5/2008 | Forbes .................. | H04L 63/126 370/242 |
| 2009/0043879 A1* | 2/2009 | Jamieson ................ | H04L 45/00 709/223 |
| 2010/0074157 A1 | 3/2010 | Doh et al. | |
| 2011/0264914 A1* | 10/2011 | Bae ......................... | H04L 63/06 713/170 |
| 2012/0197898 A1* | 8/2012 | Pandey ................... | H04L 67/12 707/741 |
| 2012/0278490 A1* | 11/2012 | Sennett ................. | H04W 4/005 709/227 |
| 2014/0056193 A1* | 2/2014 | Huang .................. | H04W 4/005 370/311 |

FOREIGN PATENT DOCUMENTS

| | | |
|---|---|---|
| KR | 10-2008-0053164 A | 6/2008 |
| KR | 10-2009-0065086 A | 6/2009 |
| KR | 10-2010-0084911 A | 7/2010 |
| KR | 10-2011-0071150 A | 6/2011 |

* cited by examiner

*Primary Examiner* — Farzana Huq
(74) *Attorney, Agent, or Firm* — IP Legal Services, LLC

(57) ABSTRACT

Described embodiments relate to a machine to machine (M2M) server for controlling a data collection interval of a M2M device. The M2M server may be configured to determine data dependency between a first M2M device and a second M2M device based on sensing data collected from the first M2M device and the second M2M device and to control a data collection interval of at least one of the first M2M device and the second M2M device based on sensing data variation of one of the first M2M device and the second M2M device.

14 Claims, 10 Drawing Sheets

CONTROLLING DATA COLLECTION INTERVAL OF M2M DEVICE

CROSS REFERENCE TO PRIOR APPLICATIONS

The present application claims priority under 35 U.S.C. § 119 to Korean Patent Application No. 10-2013-0025548 (filed on Mar. 11, 2013), which is hereby incorporated by reference in its entirety.

BACKGROUND OF THE INVENTION

The present disclosure relates to machine to machine (M2M) communication and, more particularly, to controlling data collection interval of a M2M device based on data dependency between M2M devices.

M2M communication allows devices to communicate with each other through automated data exchange without or with human intervention. That is, M2M devices are coupled to and communicate with each other through a communication network. Such M2M devices collect information and share the collected information among M2M devices or related servers. A related server may process such collected information and control a predetermined system or provide a related service based on the processing result without human intervention.

Due to such advantages, M2M communication has been applied to various application fields such as utility meters, traffic control, telemedicine, billing systems, telematics and in-vehicle entertainment, and so forth. In general, M2M devices may be powered by a battery because M2M devices may be remotely installed from a firm power source. Furthermore, a M2M device may be installed a remote location where an operator cannot physically access the M2M device. Accordingly, it is important to carefully control power consumption of each M2M device.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a data collection interval of a M2M device may be controlled based on dependency between sensing data collected from M2M devices.

In accordance with at least one embodiment, a method may be provided for controlling, by a M2M service server, a data collection interval of a machine to machine (M2M) device. The method may include determining data dependency between a first M2M device and a second M2M device based on sensing data collected from the first M2M device and the second M2M device and controlling a data collection interval of at least one of the first M2M device and the second M2M device based on sensing data variation of one of the first M2M device and the second M2M device.

The determining data dependency may include collecting sensing data from the first M2M device and the second M2M device and analyzing the collected sensing data to determine the data dependency between the collected sensing data of the first M2M device and the second M2M device.

The analyzing may include calculating a correlation coefficient value of the collected sensing data of the first M2M device and the second M2M device and determining that the first M2M device and the second M2M device have data dependency to each other based on the calculated correlation coefficient value.

The correlation coefficient value r may be calculated using Equation:

$$r = \frac{\Sigma(x_i - \bar{x})(y_i - \bar{y})}{\Sigma(x_i - \bar{x})^2 \Sigma(y_i - \bar{y})^2},$$

wherein $x_i$ denotes the sensing data collected from the first M2M device, $y_i$ denotes the sensing data collected from the second M2M device, $\bar{x}$ is a mean value of the sensing data collected from the first M2M device, and $\bar{y}$ is a mean value of sensing data collected from the second M2M device.

The analyzing may include determining that the first M2M device and the second M2M device have data dependency when the calculated correlation coefficient value is greater than about $-1.0$ and smaller than about $-0.3$ and determining that the first M2M device and the second M2M device have data dependency when the calculated correlation coefficient value is greater than about $+0.3$ and smaller than about $+1.0$.

The determining data dependency may include setting a first data collection interval value as $(1-r)$ and a second data collection interval value as $(1+r)$ when the first M2M device and the second M2M device have data dependency to each other. Otherwise, the method may include setting a first data collection interval value as 1 and a second data collection interval value as 1.

The method may further include collecting device information from the first M2M device and the second M2M device when the first M2M device and the second M2M device have data dependency to each other and classifying the first M2M device and the second M2M device into a reference M2M device and a control M2M device based on the collected device information. The collected device information may include information on a power source type and a remaining battery level and the power source type may be one of a battery type and a firm electric power type.

The classifying may include classifying a firm electric power type M2M device as the reference M2M device and classifying a battery type M2M device as the control M2M device. The classifying may include classifying a M2M device having a higher remaining battery level between the first M2M device and the second M2M device as the reference M2M device and classifying a M2M device having a lower remaining battery level between the first M2M device and the second M2M device as the control M2M device.

The controlling a data collection interval may include classifying the first M2M device and the second M2M device into a reference M2M device and a control M2M device based on device information of the first M2M device and the second M2M device and controlling the data collection interval of the control M2M device based on sensing data variation of the reference M2M device based on sensing data variation of the reference M2M device.

The method may include collecting sensing data from the reference M2M device at a regular interval, calculating a difference between previously collected sensing data and currently collected sensing data of the reference M2M device, and comparing the calculated difference with a predetermined threshold value.

The controlling the data collection interval of the control M2M device may include comparing the sensing data variation of the reference M2M device with a predetermined threshold value, increasing the data collection interval of the control M2M device when the sensing data variation of the reference M2M device is greater than the predetermined threshold value, and decreasing the data collection interval of the control M2M device when the sensing data variation of the reference M2M device is smaller than the predetermined threshold value.

The controlling the data collection interval of the control M2M device may include comparing the sensing data variation of the reference M2M device with a predetermined threshold value, controlling the data collection interval of the control M2M device by multiplying the data collection interval by a first data collection interval value when the sensing data variation of the reference M2M device is greater than the predetermined threshold value, and controlling the data collection interval of the control M2M device by multiplying the data collection interval by a second data collection interval value when the sensing data variation of the reference M2M device is smaller than the predetermined threshold value.

In accordance with at least one embodiment, a server may be provided for controlling a data collection interval of a machine to machine (M2M) device. The server may be configured to determine data dependency between a first M2M device and a second M2M device based on sensing data collected from the first M2M device and the second M2M device and to control a data collection interval of at least one of the first M2M device and the second M2M device based on sensing data variation of one of the first M2M device and the second M2M device.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
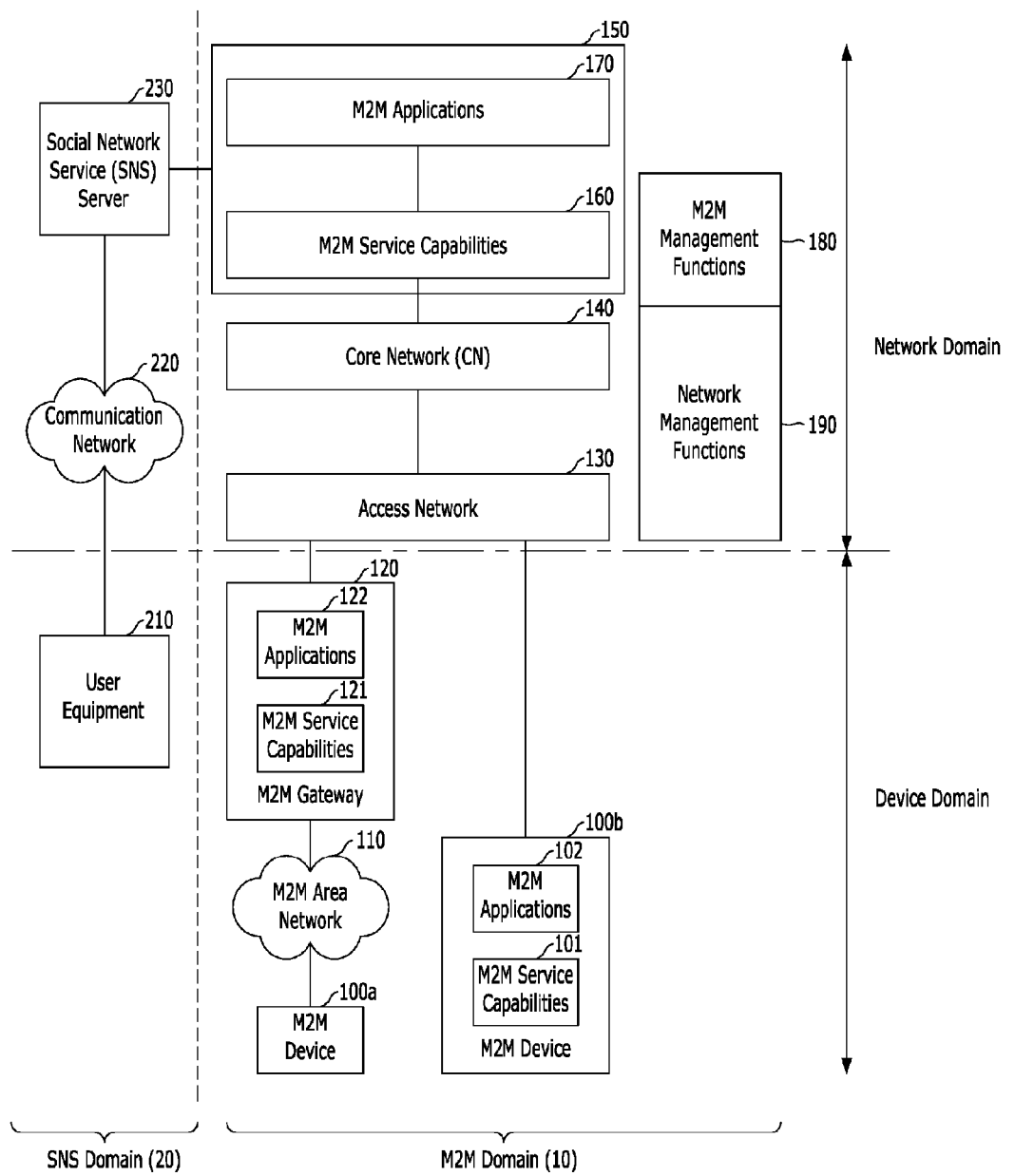
FIG. 1 illustrates system architecture for interworking of a social network service and an M2M service in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, dependency between sensor data of heterogeneous sensors as well as homogeneous may be analyzed and a data collection interval of an associated M2M device may be controlled. Such operation may reduce power consumption of an associated M2M device and improve quality of data collected from M2M devices. Before describing at least one embodiment of the present disclosure, a typical technology will be discussed briefly with reference to FIG. 1.

FIG. 1 illustrates system architecture for interworking of a social network service and an M2M service in accordance with at least one embodiment.

Referring to FIG. 1, a system for interworking of a social network service (SNS) and an M2M service may include M2M domain 10 and SNS domain 20. Herein, M2M domain 10 may be referred to as an M2M system or an M2M communication network domain. SNS domain 20 may be referred to as an SNS system or a social network domain. Each of M2M domain 10 and SNS domain 20 may be divided into a network domain and a device domain.

M2M domain 10 may include an M2M device domain and an M2M network domain. Herein, the M2M device domain may include one or more M2M devices 100a and 100b, M2M area network 110, and M2M gateway 120. Meanwhile, the M2M network domain may include access network 130, core network (CN) 140, M2M service capabilities (SCs) 160, M2M applications 170, M2M management functions 180, and network management functions 190. Particularly, in the present embodiment, M2M service capabilities (SCs) 160 and M2M applications 170 may be referred to as "M2M service server 150."

In the M2M device domain, M2M devices 100a and 100b are terminals that perform communication without a human intervention or in a state in which human intervention is minimized. In particular, M2M devices 100a and 100b may refer to any type of devices that send and forward data stored therein, in response to an external request or automatically.

According to the ETSI standard, M2M devices may be classified into (i) M2M device 100b including M2M applications 102 and M2M service capabilities (SCs) 101, and (ii) M2M device 100a not including M2M applications and M2M service capabilities (SCs). In the case that M2M device 100b directly connects to access network 130, M2M device 100b may run M2M applications 102 using M2M service capabilities (SCs) 101. Herein, the M2M applications 102 may be referred to as "device applications (DAs)." Meanwhile, M2M device 100a may not include M2M applications and M2M service capabilities (SCs). Accordingly, M2M device 100a may connect to access network 130 via M2M gateway 120. In this case, M2M device 100a may use M2M service capabilities (SCs) 121 of M2M gateway 120. Furthermore, M2M device 100a may be connected to M2M gateway 120 through M2M area network 110. For example, M2M device 100a may include devices used for a health care, and payment terminals for an offline payment (e.g., payment using a card or a smart card) and/or a mobile payment (e.g., payment using a smart phone).

M2M area network 110 may provide connectivity between M2M device 100a and M2M gateway 120. More specifically, M2M area network 110 may independently perform a variety of functions such as a network connection, a communication function, a data processing, a management function, and/or a maintenance function such that a sensing and/or operations of M2M devices can be properly performed. Furthermore, for example, M2M area network 110 may include a personal area network (PAN) and/or a local area network (LAN), but is not limited thereto. The PAN may include IEEE 802.15.x, Zigbee, Bluetooth, IETF ROLL, ISA100.11a, RFID, and so forth. The LAN may include PLC, M-BUS, Wireless M-BSU, KNX, and so forth. In addition, a variety of technologies such as a communication technology for vehicles, an industrial network, a building automation technology, and/or a home automation technology may be applied in connection with M2M area network 110.

M2M gateway 120 may run M2M applications 122 using M2M service capabilities (SCs) 121. Herein, M2M applications 122 may be referred to as "gateway applications (GAs). M2M gateway 120 may act as a proxy between M2M device 100a and access network 130. In other words, M2M gateway 120 may perform a network entry, a routing process, and/or a communication process such that M2M device 100a connected through M2M area network 110 can be connected to access network 130. Furthermore, M2M gateway 120 may receive (or collect) device operation data (e.g., sensed data) from M2M device 100a, and transmit the device operation data to a remote operation server.

As described above, in order to provide an M2M service, M2M gateway 120 and M2M device 100b may perform a variety of functions such as data collection/report functions, a remote control function, group or one-to-one communication functions, a transaction function, and so forth.

Access network 130 may allow M2M device 100b and/or M2M gateway 120 to communicate with core network (CN) 140. Access network 130 may include a variety of wired/wireless access networks. For example, access network 130 may include a CDMA/WCDMA network, a WiFi network, a WiMax network, an xDSL network, a hybrid fiber coaxial (HFC) network, a FTTH network, a PLC network, a satellite network, GERAN, UTRAN, eUTRAN, a wireless LAN, and/or an LTE network, but is not limited thereto. Furthermore, access network 130 may perform a security function when M2M device 100b and/or M2M gateway perform an access procedure.

Core network (CN) 140 may provide an IP connectivity, an access network control, network/service control functions, an interconnection with other networks, roaming functions, and so forth. Core network (CN) 140 may provide voice/data services having large-capacity and/or long distance characteristics. For example, core network 140 may include 3GPP CN, ETSI TISPAN CN, 3GPP2 CN, and/or an IP multimedia subsystem (IMS), but is not limited thereto. More specifically, core network 140 may be a large and high-speed backbone network such as a public switched telephone network (PSTN), an integrated services digital network (ISDN), an IMT-2000 network, a wide area network (WAN), LAN, a CATV network, an Internet backbone network. Furthermore, core network (CN) 140 may include M2M service capabilities which perform M2M network functions.

As described above, access network 130 and core network (CN) 140 may perform a data transfer function (e.g., transfer functions of control information and/or M2M data) such that data communication can be performed between M2M applications 170 and M2M devices 100a and 100b.

M2M service capabilities (SCs) 160 in the M2M network domain may provide functions that are to be shared by different applications, and environments that allow access to other service capabilities through open interfaces. The use of the M2M service capabilities may make it possible to develop and deploy optimized applications without considering characteristics of lower network layers. More specifically, M2M service capabilities (SCs) 160 may identify and store information associated with a provision of application functions and perform a communication selection, a remote object management, a security, a transaction management, and/or an interworking process. Core network 140 and M2M service capabilities (SCs) 160 may be referred to as "an M2M core." An M2M service capabilities layer associated with M2M service capabilities 160 may be referred to as "a network service capabilities layer (NSCL)." Hereinafter, for convenience, the NSCL may be indicated by the numeral "160".

M2M applications 170 of the M2M network domain may run an M2M service logic associated with a variety of services to be provided to M2M devices 100a and 100b, and use M2M service capabilities 160 through an open interface provided in the M2M system. Furthermore, M2M applications 170 may interwork with the M2M core such that wired/wireless connections between an operator or user terminal and M2M devices 100a and 100b can be established. M2M applications 170 may be referred to as "network applications (NA)."

In addition, the M2M network domain may include M2M management functions 180 and network management functions 190. Herein, M2M management functions 180 may include all the functions required to manage M2M service capabilities 160 in the M2M network domain. More specifically, M2M management functions 180 may perform such managements associated with an M2M network as a network configuration management, a fault management, and/or a subscriber management. In this case, the management of the M2M devices (e.g., 100a, 100b) and the M2M gateways (e.g., 120) may use a specific M2M service capability. Meanwhile, network management functions 190 may include all the functions required to manage access network 130 and core network 140. For example, network management functions 190 may include a variety of functions such as a network configuration management, a performance management, a provisioning, a supervision, a fault management, a subscriber management, a security management (i.e., a security management required for providing an M2M service), and so forth.

Furthermore, M2M service capabilities 160 in the M2M network domain may be referred to as a network service capabilities layer (NSCL). M2M service capabilities 121 in M2M gateway 120 may be referred to as a gateway service capabilities layer (GSCL). M2M service capabilities (e.g., 101) in M2M devices (e.g., 100b) may be referred to as a device service capabilities layer (DSCL). The NSCL, the GSCL, and the DSCL may be collectively referred to as a service capabilities layer (SCL). The NSCL may refer to individual platforms established for services by M2M service providers.

Referring back to FIG. 1, SNS domain 20 may include user equipment 210 and social network service (SNS) server 230. Herein, user equipment 210 and social network service (SNS) server 230 may be connected through communication network 220. Herein, communication network 220 may include a wired network and a wireless network.

User equipment 210 may be a terminal which is able to support an SNS. User equipment 210 may access SNS server 230 using an SNS application. In this case, when users input certain data using the SNS application, user equipment 210 may create a variety of traffic information such as text information, and/or image information, and transmit the traffic information to SNS server 230. Herein, traffic information may refer to social network information which is created through user equipment 210 according to activities of SNS users. In the present specification, the traffic information may be referred to as "SN traffic information," "traffic data," "user input data," "user input message," "SN data," "SN traffic," or "SN message." User equipment 210 may be a terminal which is able to perform a data communication through a communication network. For example, user equipment 210 may be at least one of (i) a mobile terminal such as a wideband CDMA (WCDMA) phone, a smart phone, a smart pad, a personal digital assistant (PDA), a notebook computer, a net-book computer, and/or an e-book, and (ii) a fixed terminal such as a personal computer, and/or a smart TV, but is not limited thereto.

SNS server 230 may analyze the SN traffic information (e.g., "Did an accident happen? The road is completely jammed. I will be late.") received from user equipment 210, and extract at least one keyword (e.g., accident, road, jam) associated with an M2M service from the SN traffic information. When extracting the at least one keyword, SNS server 230 may transmit the extracted keyword(s) to M2M service server 150. Furthermore, SNS server 230 may obtain location information associated with the keyword(s). For example, SNS server 230 may obtain location information of user equipment 210 at the time when the traffic information is input. In other embodiments, SNS server 230 may further determine at least one M2M device type associated with at least one keyword. Herein, the M2M device type may be referred to as "a mapping M2M device," "a mapping sensor." For example, in the case that keywords are "accident," "road," and "jam," the M2M device type may be determined as "a CCTV camera" and "a speed measurement device."

SNS server 230 may generate a request message including at least one of the keyword(s), the location information, and the M2M device type(s) (i.e., a mapping M2M device). More specifically, SNS server 230 may generate a request message including the keyword(s) and the location information. In other embodiments, SNS server 230 may generate a request message including the location information and the M2M device type(s) (i.e., a mapping M2M device). Herein, the request message may be generated according to an 'SNS M2M data exchange format' (SMDEF). When generating an SMDEF request message, SNS server 230 may transmit the SMDEF request message to M2M service server 150.

When receiving the SMDEF request message from SNS sever 230, M2M service server 150 may obtain at least one of the keyword(s), the location information, and the M2M device type(s), by analyzing the received SMDEF request message. More specifically, in the case that the SMDEF request message is generated using the keyword(s) and the location information, M2M service server 150 may obtain the keyword(s) and the location information by analyzing the received SMDEF request message. In this case, M2M service server 150 may determine at least one corresponding M2M device, based on the keyword(s) and the location information obtained through a message analysis process. More specifically, M2M service server 150 may obtain information on at least one corresponding M2M device which (i) is located at a specific district corresponding to the location information, and (ii) is associated with the keyword(s). In this case, M2M service server 150 may obtain information on the at least one corresponding M2M device, from M2M device information stored in a storage unit.

In accordance with at least one embodiment, a M2M service server may control a data collection interval of a M2M device based on data dependency among M2M devices. Overall operation of such a M2M service server will be described with reference to FIG. 2

Figure 2:
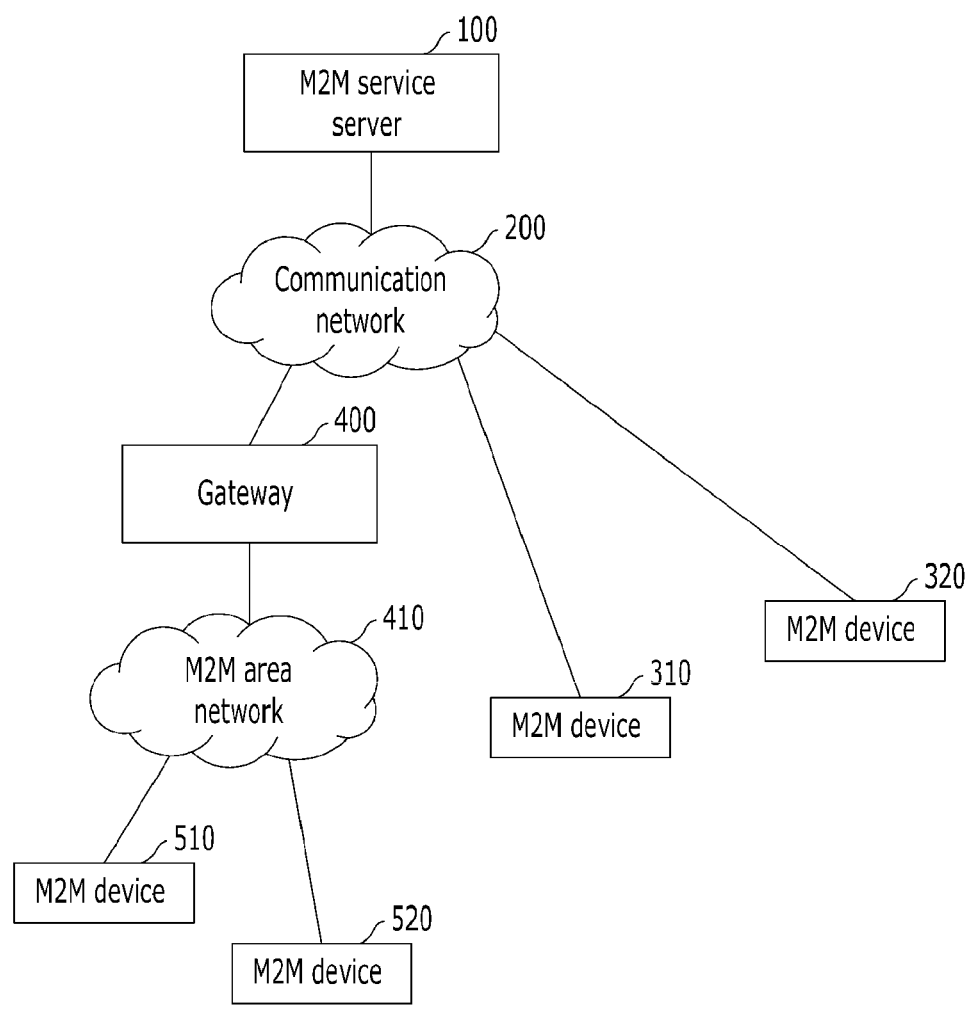
FIG. 2 illustrates an overall view of controlling a data collection interval in accordance with at least one embodiment.

FIG. 2 illustrates an overall view of controlling a data collection interval in accordance with at least one embodiment.

Referring to FIG. 2, Referring to FIG. 1, a M2M system for providing an M2M service may include M2M service server 100, at least one M2M device 310, 320, 510, and 520, and M2M gateway 400 in accordance with at least one embodiment of the present invention.

M2M devices 310, 320, 510, and 520 may be installed at a specific location or an object (e.g., a home, a bridge, a power plant, etc.) and sense and collect related data such as temperature and amount of traffic. M2M devices 310, 320, 510, and 520 may transmit the sensing result or the collected data (e.g., sensing data) to a related server. In case of a home-control M2M service, M2M device 310, 320, 510, and 520 may sense or monitor home environment recognize statuses of home electronic appliances, and/or health statuses of family members. For example, M2M devices 310, 320, 510, and 520 may include a temperature control device, a humidity control device, an air conditioning device regulating indoor air quality (IAQ), a heating device, a weighing machine, a motion sensor, an actuator, and so forth.

M2M devices 310, 320, 510, and 520 may include a sensor having a radio frequency identification (RFID) function. Such RFID sensor may be classified into a passive type RFID sensor, a semi-passive type RFID sensor, and an active type RFID sensor. The passive type RFID sensor may use a firm electric power source. In general, the passive type RFID sensor may use electric power from a reader (e.g., M2M gateway 400) to collect sensing data and to communicate with the reader. The semi-passive type RFID sensor may use battery power to collect sensing data and use electric power from a reader to communicate with the reader. The active type RFID sensor may use battery power to collect sensing data and to communicate with the reader. Since the semi-passive type RFID sensor and the active type RFID sensor use the battery power, the power consumption ratio of the semi-passive type RFID sensor and the active type RFID sensor may be significantly changed according to a data collection interval thereof. That is, when the data collection interval is unnecessary short, the power consumption ratio of the semi-passive type RFID sensor and the active type RFID sensor may increase significantly. Especially, when it is difficult to physically access to a M2M device or when it is impossible to replace a battery of a M2M device, it is necessary to efficiently control the data collection time of the M2M device.

M2M devices 310, 320, 510, and 520 may send device information (e.g., device identification, remaining batter level, and a power source type) to M2M service server 100. M2M devices 310, 320, 510, and 520 may communicate with M2M service server 120 through a wired or wireless network. M2M devices 310, 320, 510, and 520 may perform a wired/wireless interface function for communicating with M2M service server 100. More specifically, M2M devices 310, 320, 510, and 520 may communicate with M2M service server 100 through communication network 200 including an access network and a core network. For example, such an access network may include a wideband code division multiple access (WCDMA) network, a wireless broadband (Wibro) network, a $3^{rd}$ generation (3G) radio access network, a long-term evolution (LTE) network, and etc. The core network may be the Internet, public switched telephone network (PSTN), and etc. Furthermore, M2M devices 310, 320, 510, and 520 may be directly connected to communication network 200 or indirectly connected to communication network 200 through M2M gateway 400. M2M gateway 400 may manage M2M area network 410 and indirect type M2M devices 510 and 520 for ensuring M2M devices interworking and interconnected to communication network 200.

M2M service server 100 may be a server operated by an M2M service provider and connected with M2M devices 310, 320, 510, and 520. More specifically, M2M service server 100 may receive and manage sensing data and device information from at least one M2M devices 310, 320, 510, and 520. In accordance with at least one embodiment, M2M service server 100 may determine dependency between M2M devices 310, 320, 510, and 520 and control a data collection interval of each M2M device 310, 320, 510, and 520 based on the determined dependency. Such operation of M2M service server 100 will be described in detail with FIG. 3.

M2M service server 100, M2M devices 310, 320, 510, and 520, and M2M gateway 400 may communicate with each other through communication network 200 based on various types of communication protocols. Communication network 200 may be a mobile communication network or an Internet protocol (IP) network. For instance, communication network 400 may be $3^{rd}$ generation mobile network, wideband code division multiple access (WCDMA) network, $4^{th}$ generation mobile network, or long term evolution (LTE) network, but the present invention is not limited thereto. M2M devices 510 and 520 and M2M gateway 400 may be coupled each other through a physical cable and communicate with each other based on serial communication or coupled through a wireless link and communication with each other based on short range communication, for example, Bluetooth, Zigbee, or near field communication (NFC).

M2M service server 100, M2M devices 310, 320, 510, and 520, and M2M gateway 400 may have an associated network application or a M2M application in order to cooperate with each other based on a M2M protocol. In addition, M2M devices 310, 320, 510, and 520, M2M gateway 400, and M2M service server 100 may commonly employ a service capability layer (SCL) for general control of M2M communication and for storing and managing information for authentication and communication among other parties in M2M communication.

In accordance with at least one embodiment, M2M service server 100 may collect sensing data from M2M devices 310, 320, 510, and 520 and determine dependency of the collected sensing data between M2M devices 310, 320, 510, and 520. In order to determine the dependency, M2M service server 100 may calculate a Pearson's correlation coefficient value. M2M service server 100 may classify M2M devices having data dependency into a reference M2M device and a control M2M device. In order to classify, M2M service server 100 may collect device information (e.g., power source type and battery remaining level) from the M2M devices and uses the collected device information as classification criteria.

M2M service server 100 may collect sensing data from a reference M2M device (e.g., firm electric power type M2M device) at a regular interval, calculate a difference between a previously collected sensing data and a currently collected sensing data, and compare the calculated difference with a predetermined threshold. When the calculated difference is greater than the predetermined threshold, M2M service server 100 may control a data collection interval of a control M2M device (e.g., a battery power type M2M device). Such operation of controlling a data collection interval of a battery type M2M device may be useful in M2M environment where firm electric power is not available, such as a power plant or an underground facility. That is, a data collection interval of a battery type M2M device may be controlled to be comparatively short in order to reduce power consumption of the battery type M2M device. Furthermore, such operation may improve quality of sensing data collected from M2M devices. Hereinafter, such M2M service server will be described in detail with reference to FIG. 3.

Figure 3:
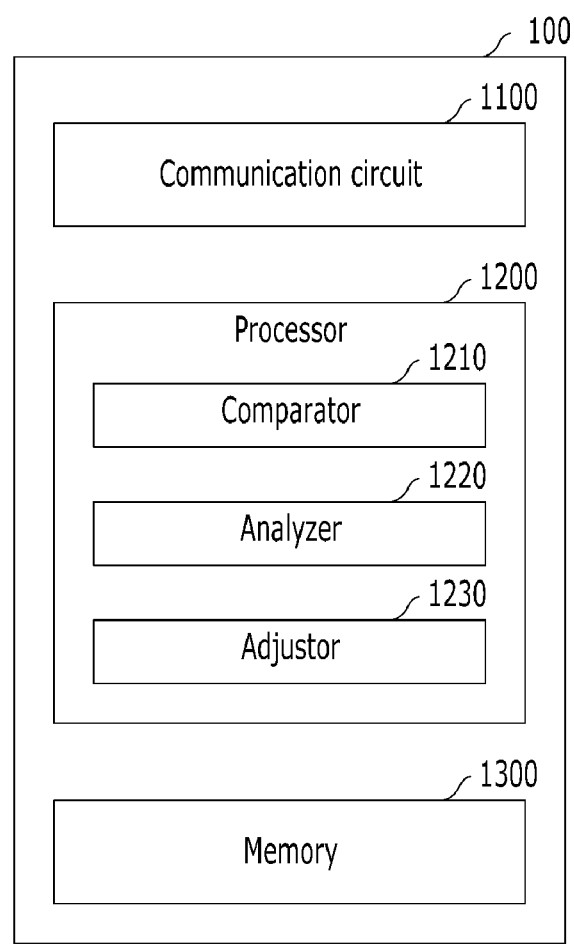
FIG. 3 illustrates a M2M service server in accordance with at least one embodiment.

FIG. 3 illustrates a M2M service server in accordance with at least one embodiment.

Referring to FIG. 3, M2M service server 100 may include communication circuit 1100, processor 1200, and memory 1300. Processor 1200 may include comparator 1210, analyzer 1220, and adjustor 1230.

Communication circuit 1100 may establish a communication link to other entities through communication network 400. For example, communication circuit 1100 may establish a communication link at least one of M2M devices 310, 320, 510, and 520 through communication network 400 and/or M2M local area network 410. Through the established link, communication circuit 1100 may receive information from or transmit information to at least one of M2M devices 310, 320, 510, and 520. For example, communication circuit 1100 perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), and Worldwide Interoperability for Microwave Access (WiMAX), or a mobile communication network based on CDMA/WCDMA or GSM/GPRS.

Memory 1300 may be data storage storing information necessary for driving M2M service server 100 and performing certain operation upon generation of a predetermined event. Such information may include any software programs and related data. Memory 1300 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto.

Processor 1200 may control overall operation of the constituent elements of M2M service server 100. In accordance with at least one embodiment, processor 1200 may include comparator 1210, analyzer 1220, and adjustor 1230. Comparator 1210, analyzer 1220, and adjustor 1230 may be implemented as software module, but the present invention is not limited thereto. Such modules may be implemented as hardware circuits.

In accordance with at least one embodiment, comparator 1210 may calculate a variation of sensor data collected from a reference M2M device and compare the calculated variation with a predetermined threshold value. The comparison result may be used to control a data collection interval of control M2M devices. For example, comparator 1210 may transmit the comparison result to adjustor 1230. Adjustor 1230 may increase or decrease the data collection interval of the control M2M device based on the comparison result from comparator 1210. That is, adjustor 1230 may increase the data collection interval of the control M2M devices when the calculated variation is greater than the predetermined threshold value. Adjustor 1230 may decrease the data collection interval of the control M2M devices when the calculated variation is not greater than the predetermined threshold value. The control M2M devices may be the same type of M2M devices (e.g., homogeneous M2M devices) or not the same type of M2M devices (e.g., heterogeneous M2M devices). Such operation of adjustor 1230 and comparator 1210 will be described in detail with reference to FIG. 4 and FIG. 8.

Analyzer 1220 may collect sensing data from M2M devices and determine dependency between the M2M devices. Particularly, analyzer 1220 collects sensing data from M2M devices and calculates a correlation coefficient value based on the sensing data values. Such a correlation coefficient value may be Pearson's correlation coefficient value and denote dependency between the M2M devices. Analyzer 1220 may provide the calculated correlation coefficient value to adjustor 1230.

Analyzer 1220 may determine dependency between the M2M devices based on the calculated correlation coefficient value r. For example, analyzer 1220 determines sensing data collected from the different M2M devices have dependency when the calculated correlation coefficient value r is greater than about −1.0 or smaller than about −0.3 or when the calculated correlation coefficient value r is greater than about +0.3 or smaller than about +1.0. Analyzer 1220 may set a first interval control value a as 1−r and a second interval control value b as 1+r. Analyzer 1220 may provide the first interval control value a and the second interval control value b to adjustor 1230.

Adjustor 1230 may collect sensing data from a reference M2M device at a regular interval. Adjustor 1230 may calculate a difference between a previously collected sensing data and a currently collected sensing data and compare the calculated difference with a predetermined threshold. Based on the comparison result, adjustor 1230 may control a data collection interval of a control M2M device.

For example, when the calculated difference is greater than the predetermined threshold, adjustor 1230 controls a data collection interval of a control M2M device by multiplying the data collection interval by the first internal control value a. When the calculated difference is equal to or smaller than the predetermined threshold, adjustor 1230 controls a data collection interval of a control M2M device by multiplying the data collection interval by the second internal control value b.

Adjustor 1230 may classify M2M devices into a reference M2M device and a control M2M device based on a power source type and a remaining battery level. Adjustor 1230 may use the power source type as the first priority for classification and the remaining battery level as the second priority for classification.

For example, adjustor 1230 may decide a firm electric power type M2M device as a reference M2M device and battery M2M device as a control M2M device when M2M devices include firm electric power type M2M devices and battery type M2M devices. Furthermore, adjustor 1230 may decide a M2M device having a high remaining battery level as a reference M2M device and a M2M device having a less remaining battery level as a control M2M device.

Hereinafter, an operation of M2M service server 100 for controlling a data collection interval of each M2M device based on dependency between sensing data collected from M2M devices will be described with reference to FIG. 4.

Figure 4:
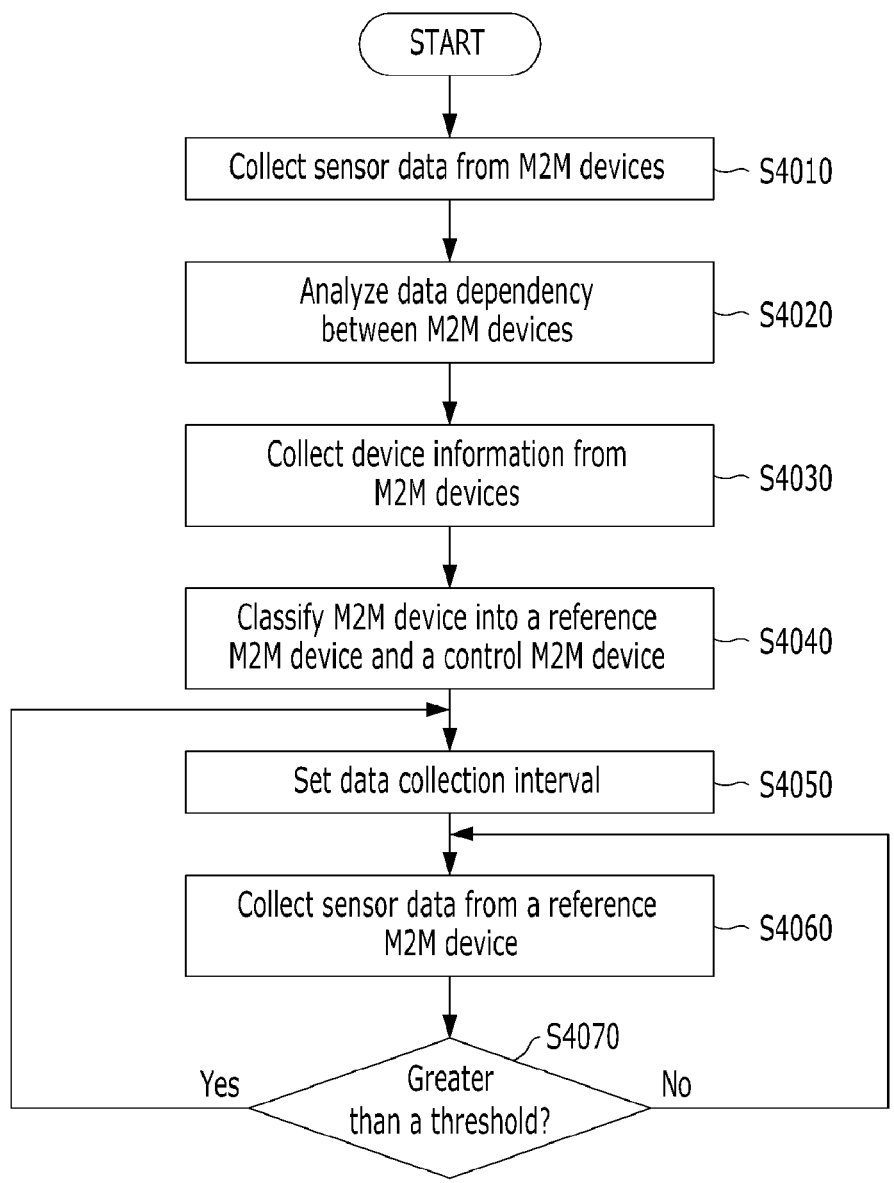
FIG. 4 illustrates a method for controlling a data collection interval of each M2M device based on dependency between sensing data of M2M devices in accordance with at least one embodiment.

FIG. 4 illustrates a method for controlling a data collection interval of each M2M device based on dependency between sensing data of M2M devices in accordance with at least one embodiment.

At step S4010, sensor data may be collected. For example, M2M service server 100 collects sensing data from a plurality of M2M devices (e.g., M2M devices 310, 320, 510, and 520) at a regular interval or an irregular interval through communication network 200.

Particularly, M2M service server 100 requests sensing data to M2M devices 310, 320, 510, and 520. In response to such request, M2M devices 310, 320, 510, and 520 may provide the requested sensing data to M2M service server 100 directly through communication network 200 or indirectly through a corresponding M2M gateway and a corresponding M2M local area network. Such providing may performed as follows. M2M service server 100 may transmit a request message to M2M devices 310, 320, 510, and 520. In response to such request, M2M devices 310, 320, 510, and 520 may update a corresponding <counterInstances> resource with the requested sensing data. Upon the update of the <counterInstances> resource, an <announce> resource of M2M service server 100 may be updated. Upon the update of the <announce> resource, M2M service server 100 may collect the requested sensing data from the <counterInstances> resource of each M2M device. Such resources will be described in detail with reference to FIG. 5.

At step S4020, data dependency may be analyzed. For example, M2M service server 100 may analyze dependency between sensing data collected from one M2M device and that collected from the other. Particularly, M2M service server 100 may calculate a Pearson's correlation coefficient value r of sensing data collected from two M2M devices. Based on the calculated Pearson's correlation coefficient value r, M2M service server 100 determines whether two sensing data (e.g., corresponding M2M devices) have dependency. Based on the dependency, M2M service server 100 may set a first interval control value a and a second interval control value b of M2M devices having dependency. For example, M2M service server 100 may decrease the first interval control value a and increase the second interval control value b by a predetermined amount. Such operation will be described in detail with reference to FIG. 6 and FIG. 7.

At step S4030, device information of M2M devices having dependency may be collected. For example, M2M service server 100 collects information on M2M devices 310 and 320 when M2M service server 100 determines that M2M devices 310 and 320 have dependency based on the calculated Pearson's correlation coefficient value r of sensing data collected from M2M devices 310 and 320. The M2M device information may include information on a power source type and a remaining power level (e.g., a remaining operation time). The power source type may be one of a battery type or a non battery type. The battery type indicates that a corresponding M2M device is driven by electric power supplied from a battery. The firm electric power type indicates that a corresponding M2M device is driven by electric power supplied from other power sources, such as a power plant through a cable. The remaining power level may denote a power level of a battery when a corresponding M2M device is a battery type. Based on the remaining power level, a remaining operation time of a corresponding M2M device may be calculated. When a corresponding M2M device a firm electric power type, the remaining power level and a corresponding remaining operation time may be infinity.

At step S4040, M2M devices having dependency may be classified into a reference M2M device and a control M2M device based on the collected device information. For example, M2M service server 100 classifies the M2M devices having the dependency into a reference M2M device and a control M2M device based on the collected device information. The classification criteria may be the power source type and/or the remaining battery level, but the present invention is not limited thereto. The power source type (e.g., battery type and firm electric power type) may be the first priority to classify. The remaining battery level may be the second priority to classify.

For example, when M2M devices having dependency includes a battery type M2M device and a firm electric power type M2M device, M2M service server 100 classifies the firm electric power type M2M device as a reference M2M device and the battery type M2M device as a control M2M device. When M2M devices having dependency include all battery type M2M devices, M2M service server 100 classifies a M2M device having the highest battery remaining level as a reference M2M device and a M2M device having less battery remaining level as a control M2M device.

Such battery remaining level of each M2M device may be determined based on an associated <etsiBattery> resource, defined in European Telecommunications Standards Institute technical specification (ETSI TS) 102 690. Such an <etsiBattery> resource may contain a standbyTime attribute value. The remaining operation time may be determined based on such a standbyTime value of the <etsiBattery> resource.

At step S4050, a data collection interval of the control M2M device may be set. For example, M2M service server 100 sets data collection intervals of the reference M2M device and the control M2M device based on the calculated first interval control value a and the calculated second interval control value b. For an initial setting operation, M2M service server 100 may set the reference M2M device and the control M2M device to have a default data collection interval $T_i$, respectively.

At step S4060, sensing data of the reference M2M device may be collected at a predetermined regular interval. For example, M2M service server 100 collects sensing data of the reference M2M device at a predetermined regular interval for adjusting the data collection time of each M2M device based on variation of sensing data.

At step S4070, a difference between a current sensing data value and a previous sensing data may be compared with a predetermined threshold value. For example, M2M service server 100 may calculate a difference between a current sensing data value and a previous sensing data value of the reference M2M device and compare the calculated difference with a predetermined threshold.

When the calculated difference is greater than the predetermined threshold value (Yes—S4070), the data collection interval of the control M2M device may be adjusted at step S4050. After the initial setting, M2M service server 100 may adjust the data collection interval of the control M2M device based on the calculated first and second interval control values a and b when a difference between a current sensing data value and a previous sensing data value of the reference M2M device is greater than a predetermined threshold. Such operation will be described in detail with reference to FIG. 8.

Otherwise (No—S4070), sensing data of the reference M2M device is continuously collected at the predetermined regular interval.

Figure 5:
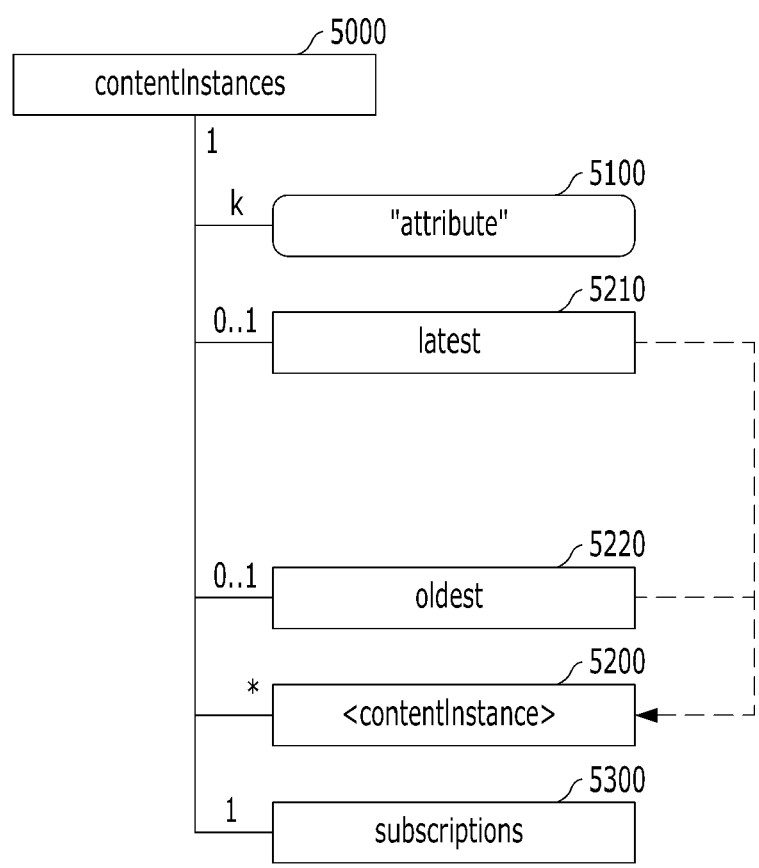
FIG. 5 illustrates resources allocated to a M2M device in accordance with at least one embodiment.

FIG. 5 illustrates resources allocated to a M2M device in accordance with at least one embodiment.

Referring to FIG. 5, a M2M device may be allowed with <countentInstances> resource 5000 for storing collected sensing data and providing the sensing data to M2M service server 100. For example, <counterInstances> resource 5000 includes various types of sub-resources such as <attribute> resource 5100, a plurality of <content> resources 5210 and 5220, <contentInstance> resource 5200, and <subscriptions> resource 5300.

<attribute> resource 5100 may store information on an attribute of each sensing data stored within <content> resources. <content> resources 5210 and 5220 may store sending data collected in chronological sequence of collecting sensing data. For example, <content> resource 5210 stores the latest sensing data and <content> resource 5220 stores the oldest sensing data. <contentInstance> resource 5200 may store one of sensing data stored in <content> resources 5210 and 5220. For example, <contentInstance> resource 5200 may be updated with the latest sensing data stored in <content> resource 5210. <subscription> resource 5300 may store information to transmit a notification message to M2M service server 100 upon the update of <contentInstance> resource 5200.

For example, M2M service server 100 may request each M2M device to provide sensing data. In response to such request, each M2M device may update a corresponding <counterInstances> resource 5000 with the requested sensing data. Upon the update of the <counterInstances> resource 5000, an <announce> resource of M2M service server 100 may be updated. Upon the update of the <announce> resource, M2M service server 100 may collect the requested sensing data from <counterInstances> resource 5000 of each M2M device. Furthermore, identification information of M2M service server 100 may be stored in <subscription> resource 5300 of a M2M device. When a M2M device updates <contentInstances> resource 5000 with sensing data, a notification message may be transmitted to M2M service server 100 based on <subscription> resource 5300 of the reference M2M device.

Figure 6:
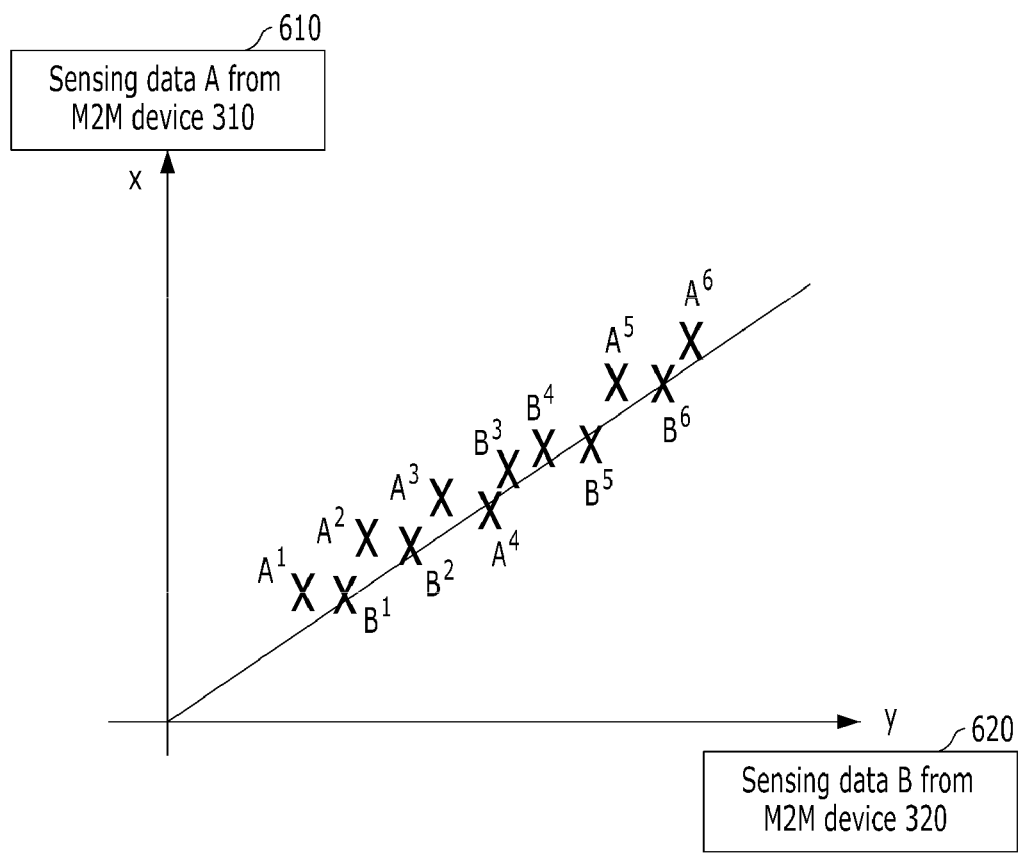
FIG. 6 is a graph showing relation between sensor data collected from two M2M devices in accordance with at least one embodiment.

FIG. 6 is a graph showing relation between sensor data collected from two M2M devices in accordance with at least one embodiment.

Referring to FIG. 6, graph 600 may show dependency of sensor data collected from two M2M devices. X-axis 610 may denote sensor data value $A^1$ to $A^6$ collected from one M2M device (e.g., M2M device 310) and Y-axis 620 denotes sensor data value $B^1$ to $B^6$ collected from the other M2M device (e.g., M2M device 320). Based on such graph 600, dependency of two sensor data may be determined. That is, M2M service server 100 may calculate a Pearson's correlation coefficient value r with the sensor data $A^1$ to $A^6$ and $B^1$ to $B^6$ of M2M devices 310 and 320. Based on the calculated Pearson's correlation coefficient value r, M2M service server 100 may determine whether the sensor data $A^1$ to $A^6$ of M2M device 310 have dependency with sensor data $B^1$ to $B^6$ of M2M device 320. Such operation will be described in detail with reference to FIG. 7.

Figure 7:
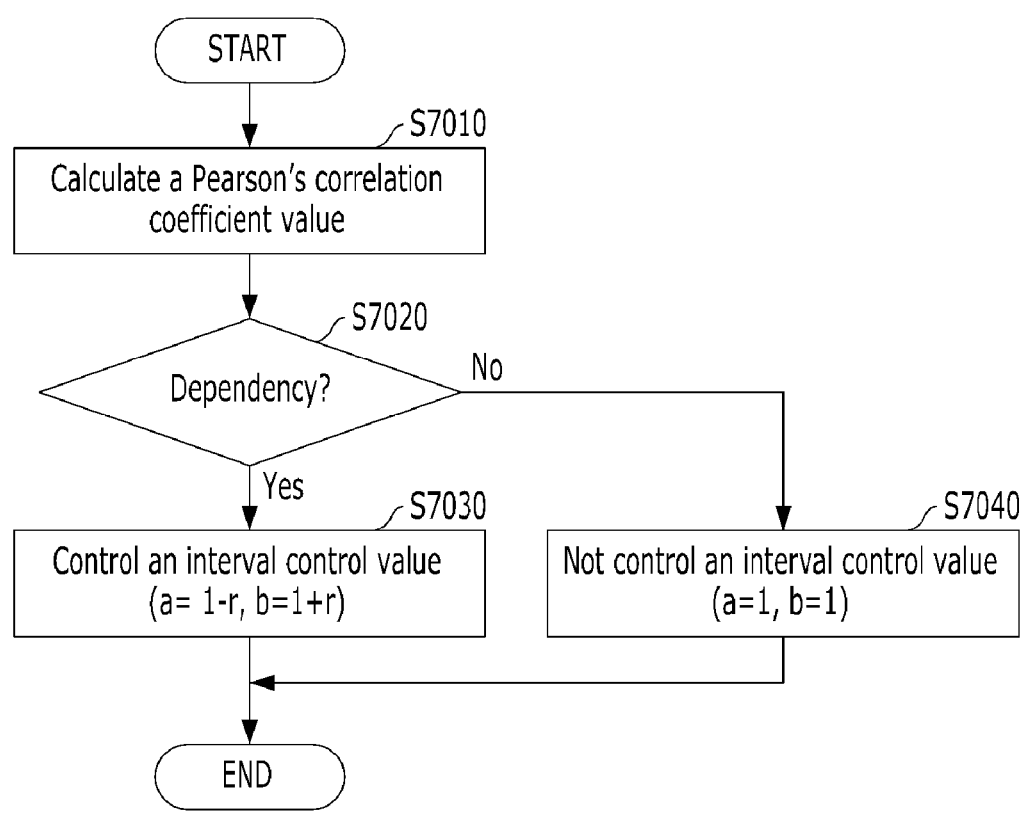
FIG. 7 illustrates determining dependency of two sensor data in accordance with at least one embodiment.

FIG. 7 illustrates determining dependency of two sensor data in accordance with at least one embodiment.

At step S7010, a Pearson's correlation coefficient value r of two sensor data may be calculated. For example, M2M service server 100 calculates a Pearson's correlation coefficient value r with the sensor data $A^1$ to $A^6$ and $B^1$ to $B^6$ of M2M devices 310 and 320. Such a Pearson's correlation coefficient value r may be calculated based on Equation 1 below.

$$r = \frac{\Sigma(x_i - \bar{x})(y_i - \bar{y})}{\sqrt{\Sigma(x_i - \bar{x})^2 \Sigma(y_i - \bar{y})^2}} \qquad \text{Equation 1}$$

In Equation 1, $x_i$ denotes sample values of sensor data $A^1$ to $A^6$ collected from one M2M device (e.g., M2M device 310) and y denotes sample values of sensor data $B^1$ to $B^6$ collected from the other (e.g., M2M device 320). $\bar{x}$ is a mean value of sensor data $A^1$ to $A^6$ collected from one M2M device (e.g., M2M device 310). $\bar{y}$ is a mean value of sensor data $B^1$ to $B^6$ collected from the other (e.g., M2M device 320).

When two sensor data have dependency, Pearson's correlation coefficient value r is close to +1 or −1. When two sensor data do not have dependency, Pearson's correlation coefficient value r is close to 0. In general, dependency between two sensor data may be determined based on table 1 below.

TABLE 1

| Pearson's correlation coefficient value | Dependency of two sensor data |
| --- | --- |
| −1.0 < r < −0.7 | Strong negative dependency |
| −0.7 < r < −0.3 | Clear negative dependency |
| −0.3 < r < −0.1 | Weak negative dependency |
| −0.1 < r < +0.1 | Ignorable dependency |
| +0.1 < r < +0.3 | Weak positive dependency |
| +0.3 < r < +0.7 | Clear positive dependency |
| +0.7 < r < +1.0 | Strong positive dependency |

At step S7020, dependency of two M2M devices may be determined based on the calculated Pearson's correlation coefficient r. For example, M2M service server 100 determines whether the calculated Pearson's correlation coefficient r is greater than about −1.0 and smaller than about −0.3, or whether the calculated Pearson's correlation coefficient r is greater than about +1.0 and smaller than about +0.3.

When the calculated Pearson's correlation coefficient r is greater than about −1.0 and smaller than about −0.3 or when the calculated Pearson's correlation coefficient r is greater than about +1.0 and smaller than about +0.3 (Yes—S3020), M2M service server 100 determines that two M2M devices have dependency at step S7030. In this case, M2M service server 100 decreases a first interval control value a (a=1−r) and increases a second interval control value b (b=1+r).

Otherwise (No—S7020), M2M service server 100 determines that two M2M devices do not have dependency at step S7040. In this case, M2M service server 100 sets the first interval control value a as 1 (a=1) and sets the second interval control value b as 1 (b=1).

Figure 8:
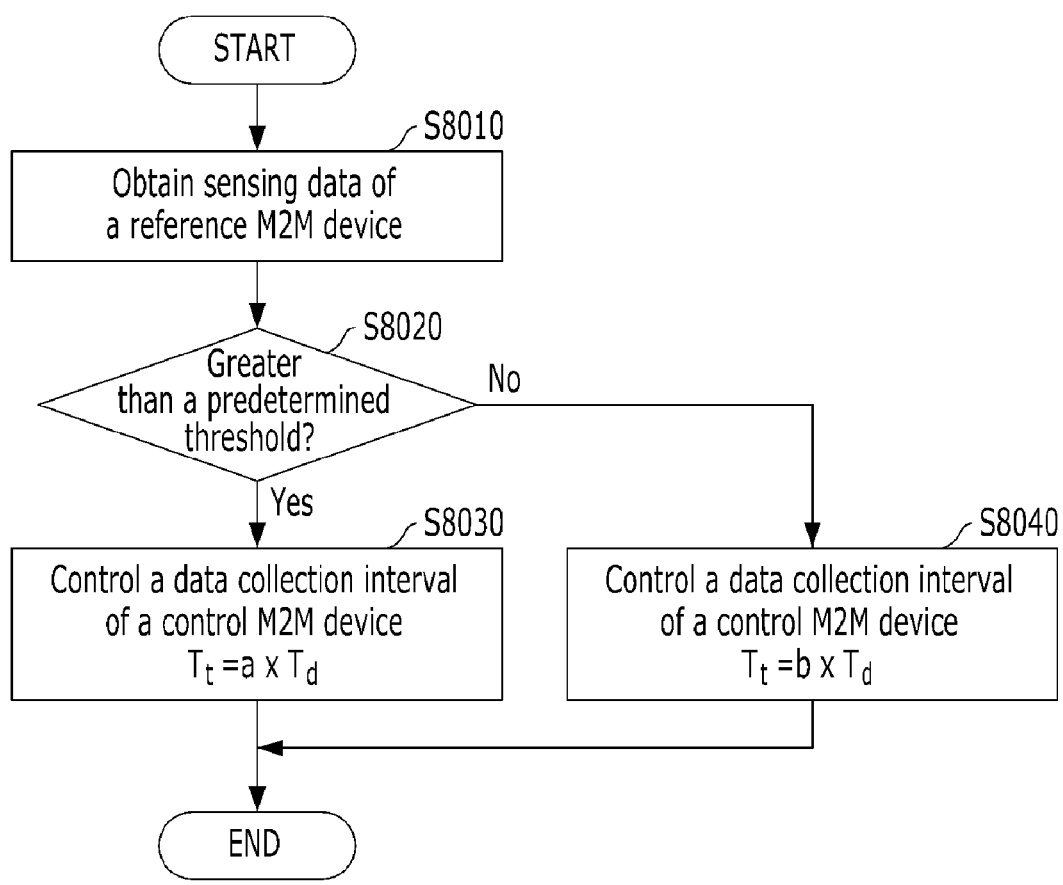
FIG. 8 illustrates controlling a data collection interval of a M2M device in accordance with at least one embodiment.

FIG. 8 illustrates controlling a data collection interval of a M2M device in accordance with at least one embodiment.

At step S8010, sensing data of the reference M2M device may be collected at a predetermined regular interval. For example, M2M service server 100 collects sensing data of the reference M2M device at a predetermined regular interval. Such collection operation may be performed as follows. M2M service server 100 may request subscribing of a <contentInstances> resource of a reference M2M device. Such operation may be performed by storing identification information of M2M service server 100 in a <subscription> resource of the reference M2M device. In this case, the reference M2M device may update a <contentInstances> resource with the sensing data at a predetermined interval. Upon the update of the <contentInstances> resource, a notification message may be transmitted to M2M service server 100 based on the <subscription> resource of the reference M2M device.

At step S8020, a difference between a current sensing data value and a previous sensing data may be compared with a predetermined threshold value. For example, M2M service server 100 may calculate a difference between a current sensing data value and a previous sensing data value of the reference M2M device and compare the calculated difference with a predetermined threshold.

When the calculated difference is greater than the predetermined threshold value (Yes—S8020), the previous data collection interval $T_d$ of a corresponding control M2M device may be controlled based on the first interval control value a at step S8030. For example, M2M service server 100 multiplies the previous data collection interval $T_d$ of the reference M2M device by the first interval control value a when the calculated different is greater than the predetermined threshold value.

When the calculated difference is not greater than the predetermined threshold value (Yes—S8020), the previous data collection interval $T_d$ may be controlled based on the second interval control value b at step S8040. For example, M2M service server 100 multiplies the previous data collection interval $T_d$ of the reference M2M device by the second interval control value b when the calculated different is not greater than the predetermined threshold value.

By controlling the data collection interval of the control M2M device as described above, an amount of overlapped sensing data may be reduced and sensing data quality may be improved. That is, an amount of meaningful sensing data may be increased. Such an amount (e.g., entropy value H(X)) of meaningful sensing data may be calculated based on Equation 2 below.

$$H(X) = E_x[I(x)] = -\Sigma P(x) \log P(x) \qquad \text{Equation 2}$$

In Equation 2, E denotes an expectation value, I denotes an amount of information of X, and P denotes a probability mass function of X. As shown in Equation 2, the entropy value (H(X)) becomes increased when distribution of data collected from each M2M device is wide. That is, when an amount of overlapped sensing data is low, the entropy value (H(X)) becomes increased.

As described above, M2M service server 100 controls data collection intervals of M2M devices based on dependency between sensing data collected from the M2M devices. Particularly, M2M service server 100 may control a data collection interval of a battery type M2M device based on variation of sensing data collected from a firm electric power type M2M device. Through controlling the data collection interval of the battery type M2M device, an operation time of such a battery type M2M device may be extended and quality of sensing data may be improved.

Such operation of controlling a data collection interval of a battery type M2M device may be useful in M2M environment where firm electric power is not available, such as a power plant or an underground facility. For example, M2M devices may include a sensor having a radio frequency identification (RFID) function. Such RFID sensor may be classified into a passive type RFID sensor, a semi-passive type RFID sensor, and an active type RFID sensor. The passive type RFID sensor (e.g., M2M device) may use a firm electric power source. In general, the passive type RFID sensor may use electric power from a reader (e.g., M2M gateway) to collect sensing data and to communicate with the reader. The semi-passive type RFID sensor may use battery power to collect sensing data and use electric power from a reader to communicate with the reader. The active type RFID sensor may use battery power to collect sensing data and to communicate with the reader. Since the semi-passive type RFID sensor and the active type RFID sensor use the battery power, the power consumption ratio of the semi-passive type RFID sensor and the active type RFID sensor may be significantly changed according to a data collection interval thereof. That is, when the data collection interval is unnecessary short, the power consumption ratio of the semi-passive type RFID sensor and the active type RFID sensor may increase significantly. Especially, when it is difficult to physically access to a M2M device or when it is impossible to replace a battery of a M2M device, it is necessary to efficiently control the data collection time of the M2M device. Hereinafter, an application example of the present disclosure will be described with reference to FIG. 9 to FIG. 11.

Figure 9:
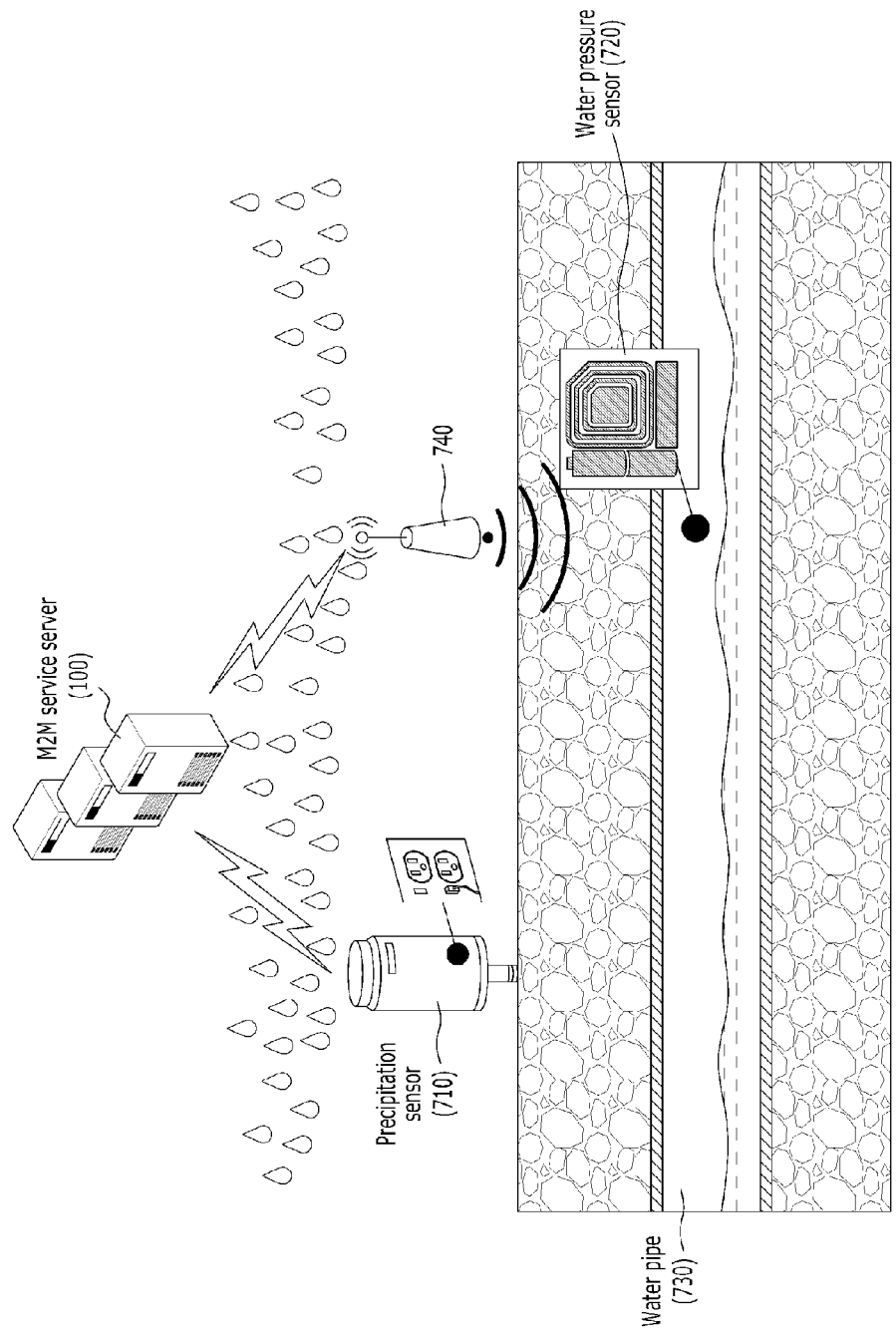
FIG. 9 illustrates a M2M system for controlling water pressure of a water pipe according to precipitation.

FIG. 9 illustrates a M2M system for controlling water pressure of a water pipe according to precipitation.

Referring to FIG. 9, such M2M system may include M2M service server 100, precipitation sensor 710, and water pressure sensor 720. M2M service server 100 may control water pipe 730 based on sensing data collected from precipitation sensor 710 and water pressure sensor 720. Precipitation sensor 710 may be a passive type M2M device using firm electric power and water pressure sensor 720 may be an active type M2M device using batter power. M2M service server 100 collects water pressure information from water pressure sensor 720 through wireless reader 740 and collect precipitation information from precipitation sensor 710.

M2M service server 100 determines data dependency between precipitation sensor 710 and water pressure sensor 720 and classifies precipitation sensor 710 as a reference M2M device and water pressure sensor 720 as a control M2M device. M2M service server 100 controls a data collection interval of water pressure sensor 720 comparatively longer to reduce power consumption of water pressure sensor 720.

Figure 10:
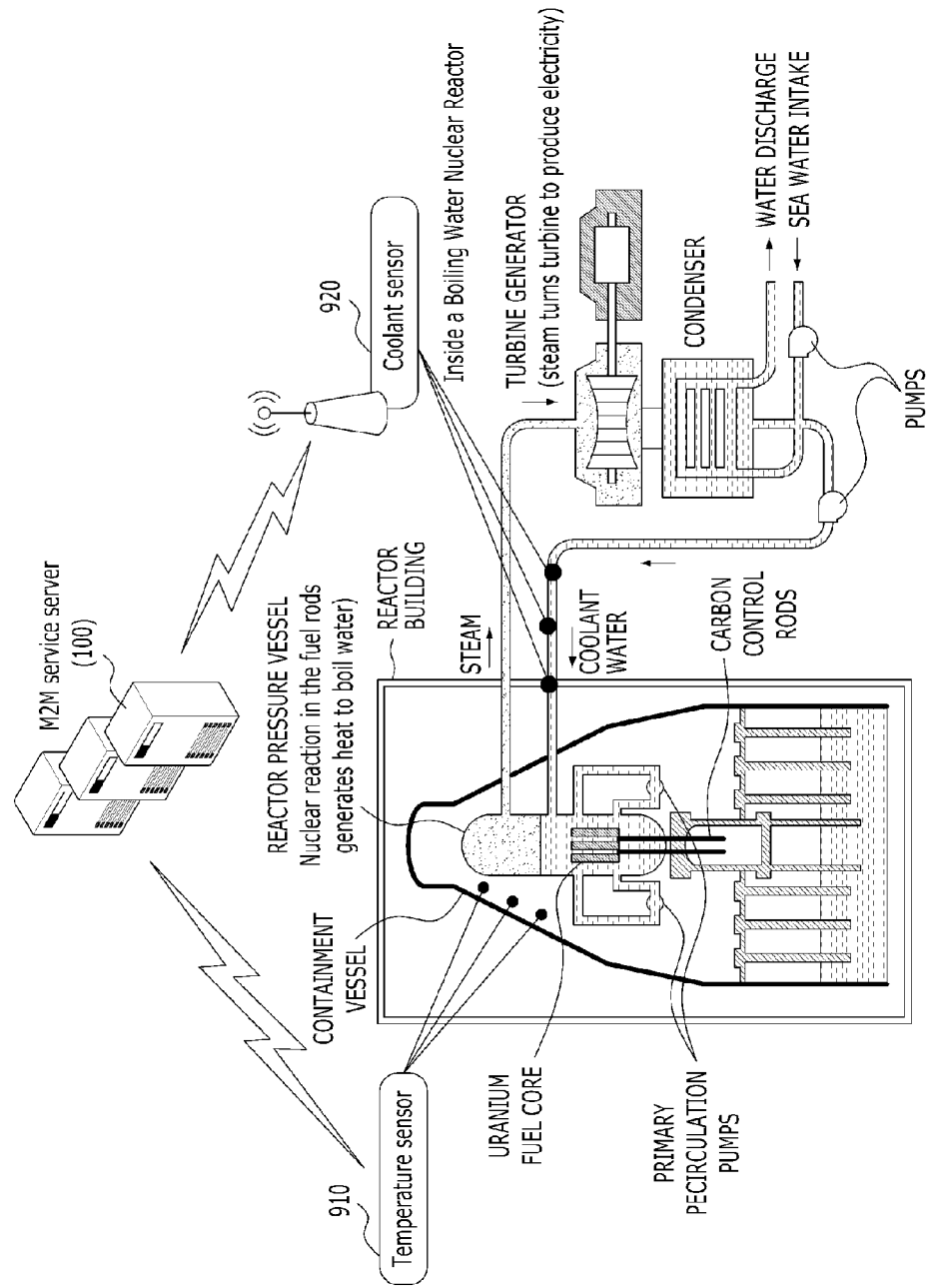
FIG. 10 illustrates a M2M system installed in a nuclear power plant.

FIG. 10 illustrates a M2M system installed in a nuclear power plant.

Referring to FIG. 10, the power plant includes a plurality of active type sensors to collect various types of data, such as temperature sensors 910 and coolant sensors 920. Since sensors are installed inside the power plant, it is very difficult to physically access sensors 910 and 920. Accordingly, it is necessary to reduce power consumption of such active type sensors 910 and 920 without inactivating sensors 910 and 920.

For example, temperature sensors 910 may be related to coolant sensors 920. M2M service server 100 may determine data dependency between temperature sensors 910 and coolant sensors 920. M2M service server 100 may collect device information (e.g., remaining battery level) from temperature sensors 910 and coolant sensors 920 and classify temperature sensors 910 and coolant sensors 920 into a reference M2M device and a control M2M device. When a remaining battery level of temperature sensor 910 is higher than that of coolant sensor 920, M2M service server 100 may determine temperature sensor 910 as a reference M2M device and coolant sensor 920 as a control M2M device. In this case, M2M service server 100 may collect sensing data from temperature sensor 920 at a regular interval, determine variation of the collected sensing data, and control a data collection interval of coolant sensor 920 when the determined variation is greater than a predetermined threshold.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention.

When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling, by a M2M service server, a data collection interval of a machine-to-machine (M2M) device, the method comprising:
    collecting a first data from a first M2M device and a second data from a second M2M device;
    determining data dependency by calculating a correlation coefficient value (r) of the collected first data and second data, wherein the data dependency is determined when the calculated correlation coefficient value is greater than about −1.0 and smaller than about −0.3, and the data dependency is determined when the calculated correlation coefficient value is greater than about +0.3 and smaller than about +1.0; and
    controlling a data collection interval of at least one of the first M2M device and the second M2M device based on the determined data dependency, by setting a first data collection interval value as (1−r) and a second data collection interval value as (1+r) when the first M2M device and the second M2M device have data correlation to each other, otherwise, setting a first data collection interval value as 1 and a second data collection interval value as 1, wherein the controlling the data collection interval of the control M2M device comprises:
    comparing the variation in data the collected from a reference M2M device with a predetermined threshold value;
    controlling the data collection interval of the control M2M device by multiplying the data collection interval by a first data collection interval value when the variation in data collected from the reference M2M device is greater than the predetermined threshold value; and
    controlling the data collection interval of the control M2M device by multiplying the data collection interval by a second data collection interval value when the variation in data collected from the reference M2M device is smaller than the predetermined threshold value.

2. The method of claim 1, wherein the correlation coefficient value r is calculated using Equation:

$$r = \frac{\Sigma(x_i - \bar{x})(y_i - \bar{y})}{\sqrt{\Sigma(x_i - \bar{x})^2 \Sigma(y_i - \bar{y})^2}}$$

wherein $x_i$ denotes the first data collected from the first M2M device, $y_i$ denotes the second data collected from the second M2M device, $\bar{x}$ is a mean value of the first data collected from the first M2M device, and $\bar{y}$ is a mean value of the second data collected from the second M2M device.

3. The method of claim 1, comprising:
    collecting device information from the first M2M device and the second M2M device when the first M2M device and the second M2M device have data dependency to each other; and
    classifying the first M2M device and the second M2M device into a reference M2M device and a control M2M device based on the collected device information.

4. The method of claim 3, wherein:
    the collected device information includes information on a power source type and a remaining battery level; and
    the power source type includes a battery type and a firm electric power type.

5. The method of claim 3, wherein the classifying includes:
    classifying a firm electric power type M2M device as the reference M2M device; and
    classifying a battery type M2M device as the control M2M device.

6. The method of claim 3, wherein the classifying includes:
    classifying a M2M device having a higher remaining battery level between the first M2M device and the second M2M device as the reference M2M device; and
    classifying a M2M device having a lower remaining battery level between the first M2M device and the second M2M device as the control M2M device.

7. The method of claim 1, wherein the controlling a data collection interval comprises:
    classifying the first M2M device and the second M2M device into the reference M2M device and a control M2M device based on device information of the first M2M device and the second M2M device;

controlling the data collection interval of the control M2M device based on variation in data collected from the reference M2M device.

8. The method of claim 7, comprising:
collecting the data from the reference M2M device at a regular interval;
calculating a difference between previously collected data and currently collected data of the reference M2M device;
comparing the calculated difference with a predetermined threshold value.

9. The method of claim 7, wherein the controlling the data collection interval of the control M2M device comprises:
comparing variation in the collected from the reference M2M device with a predetermined threshold value;
increasing the data collection interval of the control M2M device when the variation of the reference M2M device is greater than the predetermined threshold value; and
decreasing the data collection interval of the control M2M device when the variation of the reference M2M device is smaller than the predetermined threshold value.

10. A non-transitory machine-readable medium, having encoded thereon program code, wherein, when the program code is executed by a machine, the machine implements a method of controlling a data collection interval of a machine to machine (M2M) device, the method comprising:
collecting a first data from a first M2M device and a second data from a second M2M device;
determining data dependency by calculating a correlation coefficient value (r) of the collected first data and second data, wherein the data dependency is determined when the calculated correlation coefficient value is greater than about −1.0 and smaller than about −0.3, and the data dependency is determined when the calculated correlation coefficient value is greater than about +0.3 and smaller than about +1.0; and
controlling a data collection interval of at least one of the first M2M device and the second M2M device based on the determined data dependency, by setting a first data collection interval value as (1−r) and a second data collection interval value as (1+r) when the first M2M device and the second M2M device have data correlation to each other, otherwise, setting a first data collection interval value as 1 and a second data collection interval value as 1, wherein the controlling the data collection interval of the control M2M device comprises:
comparing the variation in data the collected from the reference M2M device with a predetermined threshold value;
controlling the data collection interval of the control M2M device by multiplying the data collection interval by a first data collection interval value when the variation in data collected from the reference M2M device is greater than the predetermined threshold value; and
controlling the data collection interval of the control M2M device by multiplying the data collection interval by a second data collection interval value when the variation in data collected from the reference M2M device is smaller than the predetermined threshold value.

11. The non-transitory machine-readable medium of claim 10, wherein the method further comprises:
collecting device information from the first M2M device and the second M2M device when the first M2M device and the second M2M device have data dependency to each other; and
classifying the first M2M device and the second M2M device into a reference M2M device and a control M2M device based on the collected device information.

12. The non-transitory machine-readable medium of claim 10, wherein the method further comprises:
classifying the first M2M device and the second M2M device into a reference M2M device and a control M2M device based on device information of the first M2M device and the second M2M device;
controlling the data collection interval of the control M2M device based on variation in data collected from the reference M2M device.

13. The non-transitory machine-readable medium of claim 12, wherein the method further comprises:
comparing the variation of the reference M2M device with a predetermined threshold value;
increasing the data collection interval of the control M2M device when the variation of the reference M2M device is greater than the predetermined threshold value; and
decreasing the data collection interval of the control M2M device when the variation of the reference M2M device is smaller than the predetermined threshold value.

14. The non-transitory machine-readable medium of claim 10, wherein the method further comprises:
comparing the variation of the reference M2M device with a predetermined threshold value;
controlling the data collection interval of the control M2M device by multiplying the data collection interval by a first data collection interval value when the variation of the reference M2M device is greater than the predetermined threshold value; and
controlling the data collection interval of the control M2M device by multiplying the data collection interval by a second data collection interval value when the variation of the reference M2M device is smaller than the predetermined threshold value.

\* \* \* \* \*